United States Patent [19]
Oya et al.

[11] 3,940,057
[45] Feb. 24, 1976

[54] PRESSURE COOKING APPARATUS

[75] Inventors: Takafumi Oya, Kadoma; Yoshiyuki Kashiwagi, Kadoma; Yoshihiro Kariya, Toyonaka, all of Japan

[73] Assignee: Rinnai Kabushiki Kaisha, Nagoya, Japan

[22] Filed: Oct. 29, 1974

[21] Appl. No.: 518,866

[30] Foreign Application Priority Data
Oct. 26, 1973  Japan............................. 48-122319
Oct. 26, 1973  Japan............................. 48-122318

[52] U.S. Cl. ................... 236/20; 99/333; 126/374; 236/46
[51] Int. Cl.² ....................... A23L 1/01; F24C 3/12
[58] Field of Search................... 236/20, 46, 15 A; 126/374 X; 99/333; 337/302

[56] References Cited
UNITED STATES PATENTS
| | | | |
|---|---|---|---|
| 2,472,451 | 6/1949 | Whitney | 99/333 X |
| 3,323,724 | 6/1967 | Willson | 236/46 |
| 3,577,908 | 5/1971 | Burg | 99/333 |

*Primary Examiner*—William E. Wayner
*Attorney, Agent, or Firm*—Haseltine, Lake & Waters

[57] ABSTRACT

Pressure cooking apparatus using a pressure container with a sensor of the temperature or pressure in the container adapted to control a timer when a given condition is reached, the timer acting on the heating unit after a given time has expired to stop the operation thereof.

3 Claims, 4 Drawing Figures

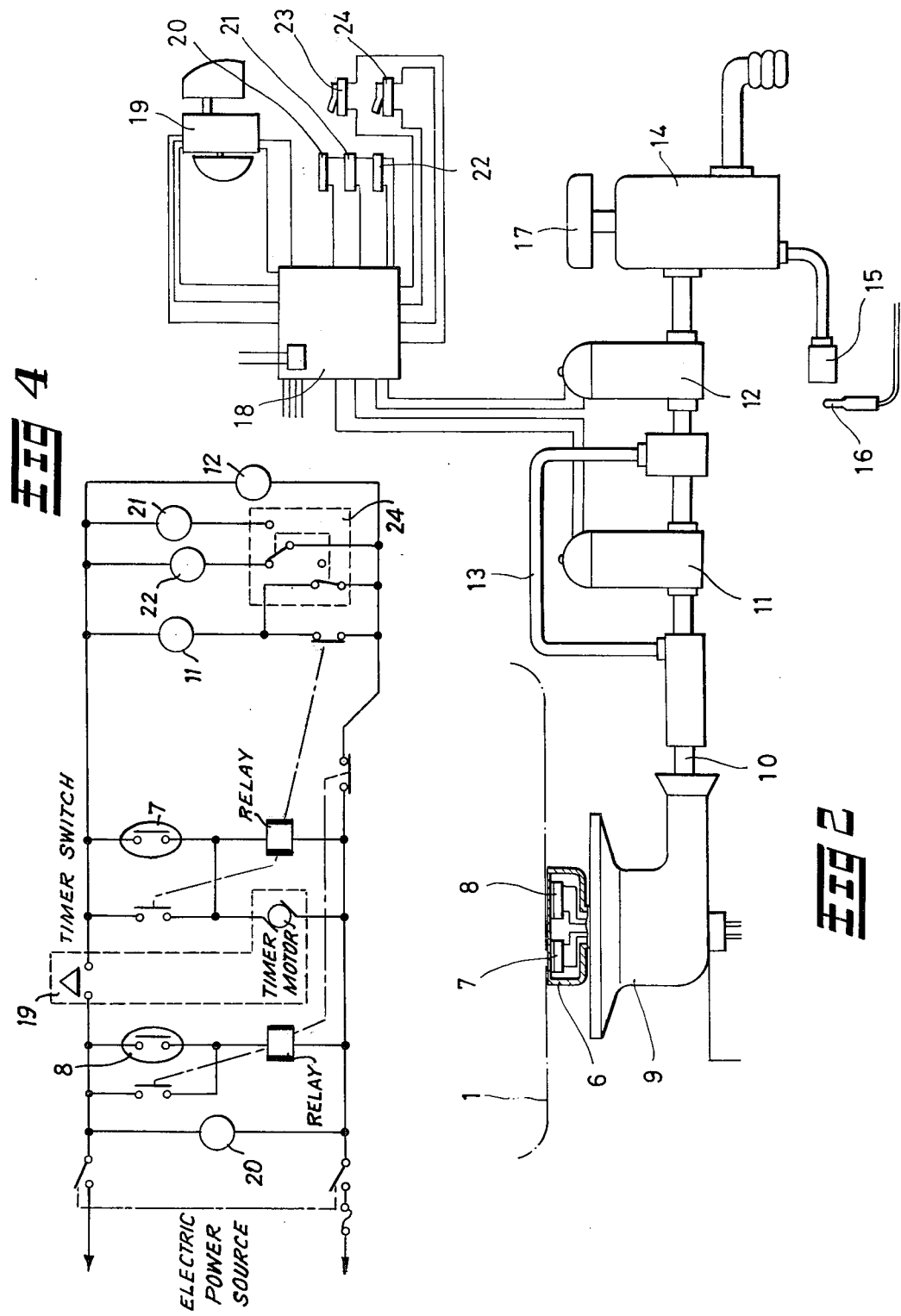

PRESSURE COOKING APPARATUS

FIELD OF THE INVENTION

This invention relates to pressure cooking apparatus of the type in which pressure cooking is carried out using a pressure container, such as a pressure cooking pot or the like.

BACKGROUND

In pressure cooking using a pressure container, the major factors affecting the cooking are the application pressure and the time of pressure application.

If the application pressure is now considered, the same is required, from the viewpoint of safety, to be set to the minimum pressure necessary for cooking. Accordingly, for cooking various kinds of materials, it is required that the time of pressure application be adjusted and the cooking effected with the adjusted time of pressure application suitable for the particular material.

If, next, the case is considered in which a pressure application is to be effected, it is so arranged that atmospheric pressure within the pressure container, before heating is raised by heating to a set pressure and thereafter the pressure is held at this value by the opening of a pressure set valve.

Referring to FIG. 3, for example, if it is assumed that in the case of cooking beans in an ordinary container, which is not a pressure container, the internal temperature reaches 100° C after 10 minutes and the cooking is completed by heating for about 120 minutes thereafter as shown by curve A. In the case where a pressure container is used, as shown by curve B, the internal temperature reaches 120° C due to pressure application after the same 10 minutes, and the product is heated at 120° C for about 30 minutes thereafter and the cooking is finished at point *a*. In either of cases A or B, the time taken to raise the temperature to 100° C or 120° C varies depending on the amount of beans within the container or the intensity of the heating. If the time from the start of the cooking to the finish thereof is comparatively long as in case A, the cooking result is not materially changed if the entire cooking time is set by a timer. In case B, however, if the time from the start of the cooking to the finish thereof is set at a constant value by a timer, for instance, a large difference in the cooking result is produced if the time taken for the temperature to rise to 120° C varies. Namely, it takes 40 minutes from the start of cooking to the finish thereof in case B, but if the time from the start to the finish is tentatively set at 40 minutes on a timer, in the case in which the temperature rises to the set temperature in 5 minutes as shown by curve C due to the fact that the material to be cooked is small in amount or the heating intensity is great, the cooking is finished after 35 minutes so that overcooking results. In the case where the temperature reaches 120° C after 20 minutes from the start of cooking as shown by curve D due to the fact that the material is large in amount or the heating intensity is low, the cooking is terminated 20 minutes after reaching 120° C resulting in insufficient cooking. Consequently, the cooking time after the set temperature has been reached is required to be accurate. Thus, as far as the pressure container is concerned, if the entire cooking time is set by a timer, the cooking result will not be constant if the time taken to reach the set temperature varies depending on the amount of the material to be cooked or on the intensity of heating. Accordingly, these disadvantages can be overcome only if the cooking time after the set temperature or pressure is reached is accurately set.

If, the entire cooking time is now considered, the same can be shortened if it is so arranged that the time after the set pressure influencing the cooking result is reached is kept as proportionately long as possible while the time from the start of cooking to reaching the set pressure is made as proportionately short as possible.

SUMMARY OF THE INVENTION

An object of the invention is to provide pressure cooking apparatus with means to overcome the disadvantages noted above.

The invention contemplates that proper cooking can be effected by starting a timer means simultaneously with the time when the set pressure is reached after the start of the cooking.

According to the invention there is provided pressure cooking apparatus using a pressure container comprising means for sensing when a pressure or a temperature within the pressure container reaches a set value upon heating of the pressure container, and a timer means connected to the sensing means to be started upon energization thereof and to finish the cooking after the passage of a set time on the timer means.

In further accordance with the invention there is provided a heating means for heating the pressure container, and means coupled to the heating means and timer means for stopping the operation of the heating means after the passage of the set time of the timer means.

In still further accordance with the invention the heating means includes means for establishing a low heat condition and a high heat condition, said heating means being changed over from the high heating condition to the low heating condition when the pressure or temperature within the pressure container reaches the set value.

According to a feature of the invention the sensing means comprises a first thermal sensitive switch which is set to operate at a comparatively low temperature, and a second thermal sensitive switch which is set to operate at a comparatively high temperature, the latter being arranged to stop the operation of the heating means when it is operated.

The heating means comprises a gas burner, a conduit connected to said gas burner, a first control valve and a second control valve connected in series with each other in said gas conduit, and a bypass passage small in diameter relative to said conduit connected in parallel with said first control valve, such that the first control valve is closed when the sensing means operates and the timer means is activated, and the second control valve is closed at the expiration of the operation of the timer means.

Preferably to avoid scorching, the second control valve is closed by the operation of the second sensitive switch.

BRIEF DESCRIPTION OF THE DRAWING

FIG. 2 is a front view, partly in section, of an apparatus according to the present invention;

FIG. 4 is a circuit diagram of the electrical components in FIG. 2.

DETAILED DESCRIPTION

Figure 1:
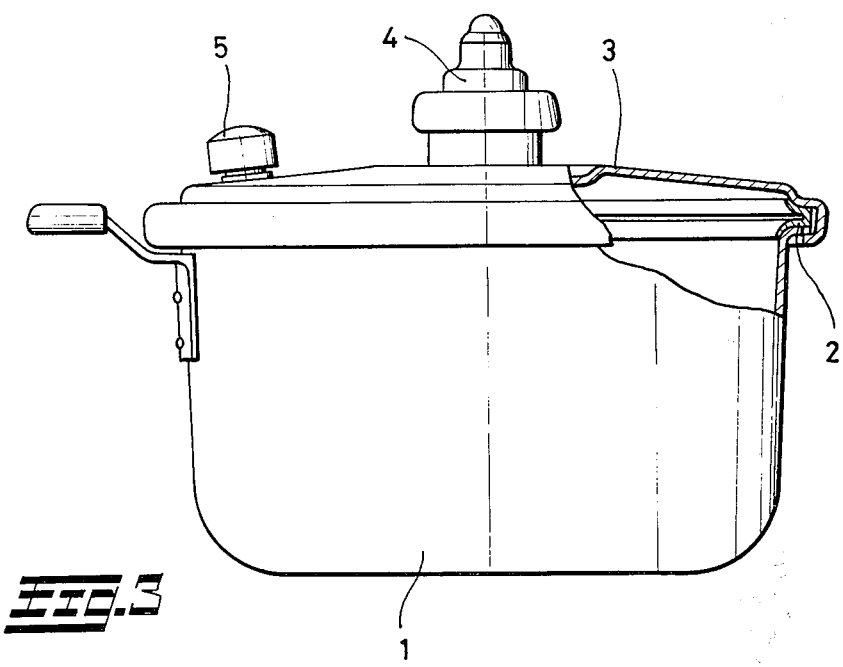
FIG. 1 is a front view, partly in section, of a pressure container used in this invention.
Figure 3:
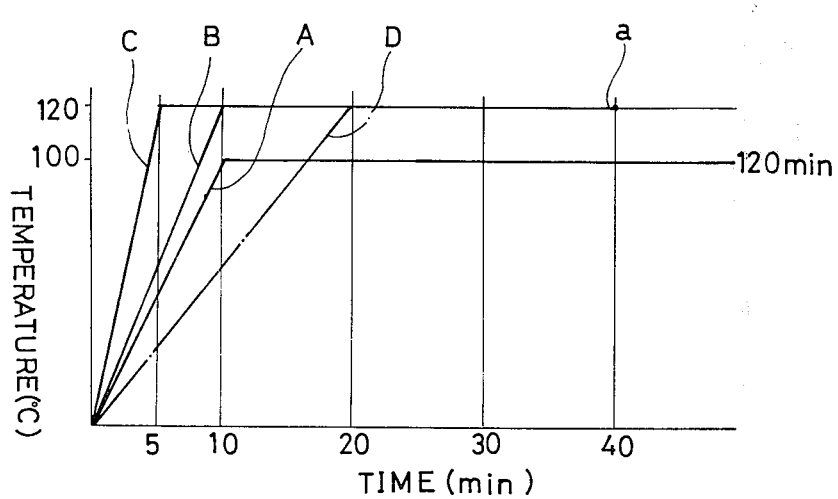
FIG. 3 is a graphical diagram showing cooking conditions.

FIG. 1 shows a pressure container used in one embodiment of a pressure cooking apparatus according to the present invention. Herein, a lid 3 is put on the container 1 through a seal 2, and a locking means (not illustrated) is applied thereto so that vapor or the like, does not leak through any gap between the container 1 and the lid 3 even when the internal pressure of the container 1 rises. The lid 3 is provided at its center portion with a pressure setting valve 4. This pressure setting valve 4 is a conventional type of safety valve in which pressure is set by a weight, and functions in such a manner that when the internal pressure of the container 1 reaches the set pressure, the valve 4 is opened thereby and exhausts excessive pressure vapor within the container 1 so that the interior of the container 1 is kept at the set pressure. The lid 3 is provided with another safety valve 5, so that if the foregoing pressure setting valve 4 should not open because of blocking of the valve opening or any other reasons, the safety valve 5 is opened to exhaust the excess pressure within the container 1 before the internal pressure of the container 1 increases to a dangerous value.

FIG. 2 shows an embodiment of apparatus according to the present invention and therein numeral 6 denotes a casing tightly secured to the bottom portion of the container 1, and fixed within the casing 6 are two detecting means in the form of first and second thermal sensitive members 7, 8 each serving for detecting the temperature of the bottom portion of the container 1. The first sensitive member 7 is so arranged as to operate at a comparatively low temperature by detecting a temperature exhibiting indirectly and proportionally a temperature at the time when the pressure within the container 1 reaches the set pressure, and the second sensitive member 8 is arranged for a higher setting in which it operates when the temperature is further increased.

Numeral 9 denotes a main burner constituting a heating means for the container 1; numeral 10 denotes a gas conduit connected thereto. First and second control valves 11, 12 of electromagnetic type are interposed in the conduit in series with one another, and a bypass passage 13 is connected to conduit 10 in parallel with the first control valve 11, so that the burner 9 can be supplied with gas through the bypass passage 13 even when the valve 11 is closed. The bypass passage 13 is smaller in diameter than the gas conduit 10, so that the amount of gas flowing through the bypass passage 13 is smaller than that of gas supplied to the burner 9 when the valve 11 is open, and the passage 13 is determined to supply the minimum gas amount to maintain the internal pressure in the container 1 at the set pressure, as will be described hereinafter.

Numeral 14 denotes a conventional safety device and the same is mounted at a hose-connecting end portion of the gas conduit 10. If a push button 17 of the safety device 14 is pushed, a valve within the device 14 is opened, whereby gas is supplied as far as the control valve 12 and at the same time issues from a pilot burner 15. If, accordingly, this gas is ignited in a suitable manner, a thermocouple 16 is heated by the flame at the burner 15 and electric current caused by a thermal electromotive force thereof passes through an electromagnetic coil within the device 14, whereby the valve of the safety device 14 is kept open even when the push button 17 is released. If the pilot burner 15 is extinguished for any reason and the thermocouple 16 cools down, the electromagnetic coil within the safety device 14 is deenergized and the valve in device 14 is closed to stop the gas supply.

Numeral 18 denotes a casing containing portions of necessary electric circuits, numeral 19 denotes a timer means comprising a timer switch, numerals 20, 21 and 22 denote pilot lights, and numerals 23 and 24 respectively denote a power switch and a changeover switch. The circuit is shown in detail in FIG. 4.

By operating the foregoing safety device 14, the pilot burner 15 is fired and the thermocouple 16 is heated and thereby the valve of the safety device 14 opens. If, then, the power switch 23 is closed, electric current from a power source passes through the pilot light 20 to illuminate the same. If, then, the changeover switch 24 is changed over to a first cooking condition or state (cooking of the type in which water or fluid is to remain at the finish of cooking), the pilot light 21 is lit and the control valves 11, 12 are opened and gas supplied from a gas nozzle flows from the main burner 9 and is ignited by the pilot burner 15 and thus the container 1 is heated with a strong flame. Accordingly, the water, and other materials within the container 1 are heated and the internal pressure of the container increases. When the internal pressure of the container 1 reaches the set or prescribed pressure, the first thermal sensitive member 7 reaches the set temperature substantially simultaneously therewith, whereby the member 7 is closed and thereby a relay is operated to close only the first control valve 11 and at the same time the timer switch 19, which is previously set to a predetermined time period, is energized to start counting time. At this stage, gas flows into the burner 9 only through the bypass passage 13, so that the main burner 9 is in a low fire condition and serves to heat the container 1 to such an extent that the internal pressure thereof does not drop below the set pressure. Thereafter, the control valve 12 is kept open until the set time of the timer switch 19 has expired, and the valve 12 is then closed and thereby the gas supply to the main burner 9 is completely stopped and the cooking is finished.

In the case of carrying out such a type of cooking in which excess water does not remain at the finish of cooking, such as in the cooking of rice, the changeover switch 24 is changed over to the other condition or state, whereby the pilot lamp 22 is lit and the two valves 11, 12 are opened and the burner 9 operates with a strong flame. When the first thermal sensitive member 7 reaches the set temperature, the valve 11 is closed to change the burner 9 to a weak flame condition. When this cooking is finished and the water within the container 1 becomes exhausted so that the temperature of the container 1 further rises, the second sensitive member 8 operates to close the valve 12 to stop the gas supply to the burner 9.

In the above embodiment, although the condition in which the pressure within the container 1 reaches the set pressure is detected by detecting the temperature rise at the bottom portion of the container 1, it is also within the ambit of one skilled in in the art to bring the burner into a weak flame condition when the internal pressure reaches the set pressure by detecting the pressure itself within the container 1 by any suitable means.

However, the construction can be simplified if, as mentioned above, it is so arranged that the internal temperature at the time of the set pressure may be detected indirectly and proportionally at the outside of the container 1.

According to this invention, as described above, in cooking by heating various kinds of materials in a pressure container, a timer means is started from the point when it has detected that the pressure within the container has reached the set pressure so as to give a heating time suitable for the cooking material and the amount thereof, so that no influence is made on the cooking result even if the time taken to reach the set pressure or the set temperature is varied. Additionally, in the case of cooking in which water is to remain at the finish of the cooking, the second sensitive member 8 is also effective in operating before the water is evaporated, thereby avoiding scorching from taking place in the event of a mistake in the setting of the timer means.

The above explanation has been given in the case where the force of the fire is lowered when it reaches the set pressure or the set temperature, but it is of course possible to effect cooking with the same force of fire, for instance, by setting the timer switch 19 longer than the expected finish time of cooking.

What is claimed is:

1. Pressure cooking apparatus using a pressure container comprising sensing means for sensing when a pressure or a temperature within the pressure container reaches a set value upon heating of the pressure container, a timer means connected to the sensing means to be started upon energization thereof and to finish the cooking after the passage of a set time on the timer means, a heating means for heating the pressure container, and means coupled to the heating means and timer means for stopping the operation of the heating means after the passage of the set time of the timer means; said heating means comprising a gas burner, a conduit connected to said gas burner, a first control valve and a second control valve connected in series with each other in said gas conduit and a bypass passage small in diameter relative to said conduit connected in parallel with said first control valve, such that the first control valve is closed when the sensing means operates and the timer means is activated, and the second control valve is closed at the expiration of the operation of the timer means.

2. Pressure cooking apparatus as claimed in claim 1, wherein the second control valve is closed by the operation of the second sensitive switch.

3. Pressure cooking apparatus using a pressure container comprising sensing means for sensing when a pressure or a temperature within the pressure container reaches a set value upon heating of the pressure container, a timer means connected to the sensing means to be started upon energization thereof and to finish the cooking after the passage of a set time on the timer means, a heating means for heating the pressure container, and means coupled to the heating means and timer means for stopping the operation of the heating means after the passage of the set time of the timer means; said sensing means comprising a first thermal sensitive switch which is set to operate at a comparatively low temperature, and a second thermal sensitive switch which is set to operate at a comparatively high temeprature, the later said switch being arranged to stop the operation of the heating means when it is operated, said apparatus further including a common casing for said first and second thermal sensitive switches.

* * * * *